A. STECKER.
SAW JOINTER.
APPLICATION FILED OCT. 21, 1909.
977,233.
Patented Nov. 29, 1910.
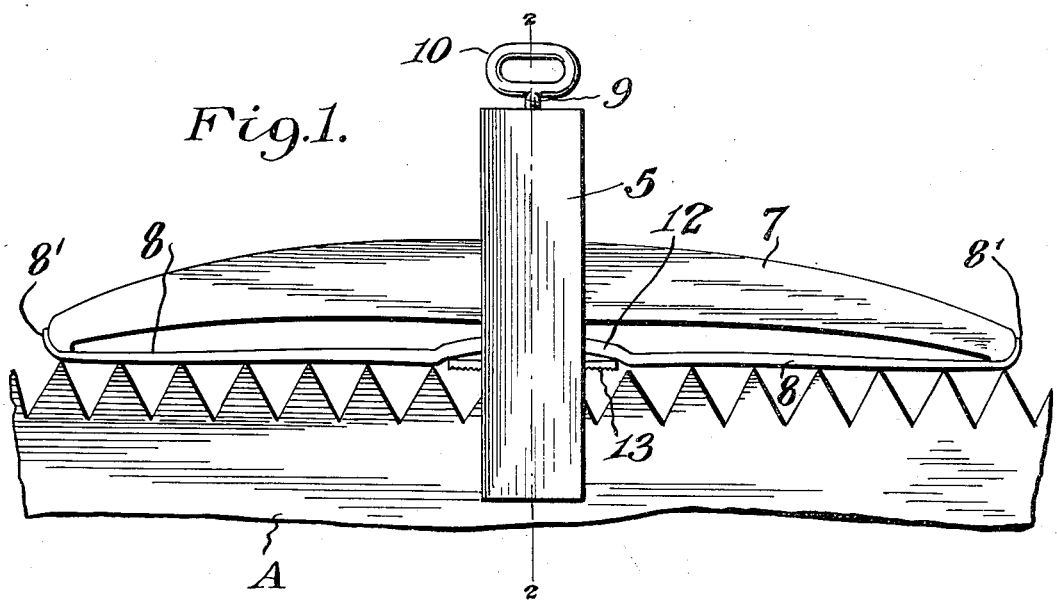
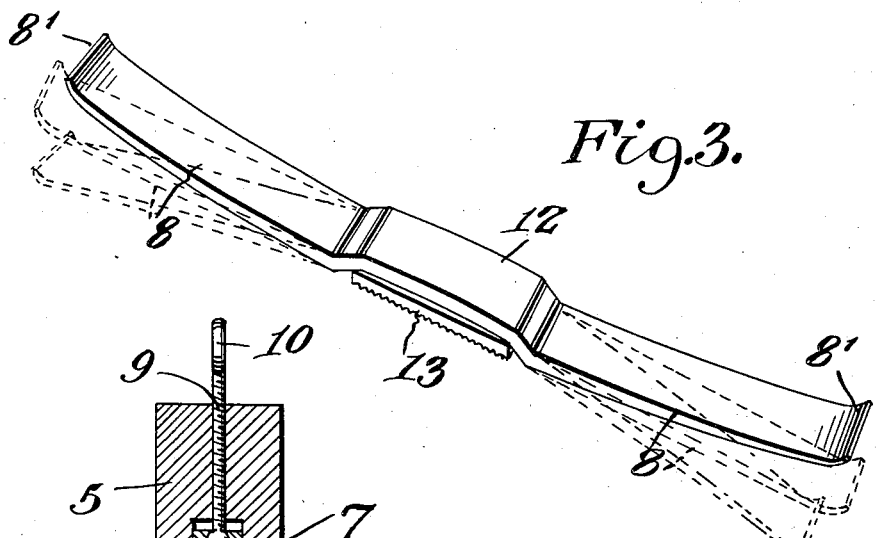
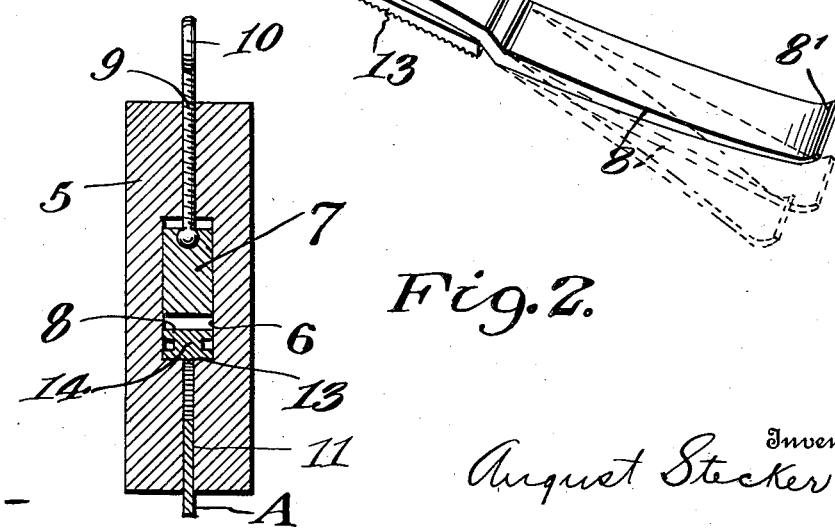
Witnesses:—
Joe. P. Wahler.
E. M. Ricketts.
Inventor
August Stecker
By Watson E. Coleman
Attorney

UNITED STATES PATENT OFFICE.

AUGUST STECKER, OF ROZELLVILLE, WISCONSIN.

SAW-JOINTER.

977,233.　　　　Specification of Letters Patent.　　Patented Nov. 29, 1910.

Application filed October 21, 1909. Serial No. 523,861.

*To all whom it may concern:*

Be it known that I, AUGUST STECKER, a citizen of the United States, residing at Rozellville, in the county of Marathon and State of Wisconsin, have invented certain new and useful Improvements in Saw-Jointers, of which the following is a specification, reference being had to the accompanying drawings.

This invention relates to certain new and useful improvements in saw jointers, and has for its object to provide a device for truing the teeth of cross cut saws of that character wherein the saw teeth are disposed in an arc from end to end of the saw blade.

Another object is to provide a device of the above character which is adapted to be positioned upon the blade of the saw and to move longitudinally thereon, and comprises an adjustable bar with the ends of which the extremities of a leaf spring are engaged, the adjustment of said bar causing the spring to bow and assume substantially the same arc as that of the saw teeth, and a file secured to a raised portion of the spring adapted to engage and reduce the length of certain of the saw teeth.

With these and other objects in view, the invention consists of the novel construction, combination and arrangement of parts hereinafter fully described and claimed, and illustrated in the accompanying drawing, in which—

Figure 1 is a side elevation of the device positioned on the saw blade; Fig. 2 is a vertical section taken on the line 2—2 of Fig. 1; and Fig. 3 is a detail view of the spring.

Referring to the drawings 5 indicates a head block which is provided with a central rectangular aperture 6 in which a horizontally positioned bar 7 is disposed and is vertically adjustable. As shown in the drawings this bar is slightly curved between its ends with which the opposite extremities of the leaf spring 8 are engaged. An adjusting screw 9 extends vertically through the upper portion of the head block and engages with the center of the bar 7. This screw is provided at its upper end with a suitable handle portion 10 whereby it may be manipulated. A kerf 11 extends vertically through the center of the lower portion of the head block and communicates at its upper end with the rectangular opening 6. This kerf is adapted to receive the saw blade A, the bar 7 being thus disposed above the teeth of the saw. It will be obvious that owing to the curvature of the bar 7 which provides a space between the lower edge of the bar and the spring 8, when the adjusting screw 9 is turned to move the bar downwardly in the aperture 6, the spring 8 will be bowed downwardly from its center. In this manner the spring may be adjusted to contact with the teeth of the saw at its ends. It will be noted that the spring blade gradually increases in thickness from its ends toward the center. The extremities of the spring are upwardly bent, as at 8' and engage over the ends of the bar 7. Thus the spring is securely held against longitudinal movement beneath the bar. By varying the thickness of the blade the proper resiliency is secured whereby it will readily assume the various positions as shown in dotted lines in Fig. 3 when the bar 7 is adjusted in the block. The central portion of the spring blade is curved upwardly and disposed in a different horizontal plane from the end portions thereof as shown at 12. Carried by this central raised portion of the spring 8 and spaced from the under side thereof there is a file 13, which may be integrally formed with the spring blade by the central connecting web 14.

It will be noted that the file is disposed slightly above the bottom surface of the end portions of the spring blade, and as the device is moved upon the blade of the saw the longer teeth will engage the file as the central portion of the device is moved over the same. Thus the length of the saw teeth will be made uniform throughout the length of the saw, as after the adjusting bar has been moved to position the ends of the spring blade on the saw teeth, the proper arc of the teeth will be maintained until all of the teeth have been reduced to a uniform length.

By means of the device above described, the length of the teeth of cross cut saws such as are commonly employed for felling trees may be quickly reduced to a common length, and can then be filed in the ordinary manner to any desired depth. It has been found that when the teeth of such saws are of irregular length, the cutting action of the saw is imperfect and satisfactory results from its use cannot be obtained. The utility and desirability of such a device as above set forth will therefore be apparent to those skilled in the art, and as but few elements are employed in its construction it will be obvious that the cost of manufacture will be extremely small.

While I have shown and described what I believe to be the preferred form of my invention, it will be obvious that numerous minor modifications may be resorted to in its construction without departing from the essential features or sacrificing any of the advantages of the invention. For instance, while the adjusting screw 9 would preferably be secured to the bar 7 to retain it in the head block, other means could be employed for this purpose and the end of the adjusting screw merely bear upon the bar. Also the file 13 could have detachable engagement with the spring blade, whereby files of varying grades could be secured thereto. The device, however, would preferably be constructed as above described wherein the strength, durability and simplicity are combined to provide a device which is easy to operate and highly efficient in use.

Having thus described the invention, what is claimed is:

1. In a device of the character described, a head block having a central opening therethrough adapted for movable engagement with a saw blade, a bar disposed in said opening and extending laterally from the opposite edges of said block, a spring blade spaced from the lower edge of said bar but having its extremities engaged with the opposite ends thereof, and means for adjusting said bar vertically in the aperture of said block to bow said spring blade, said blade carrying a file adapted to engage with the saw teeth as the block is moved upon the saw blade.

2. In a device of the character described, a head block having a central rectangular aperture therethrough, the lower portion of said block having a kerf therein communicating at its upper end with said aperture and adapted to receive the blade of the saw to position the block thereon, a bowed bar disposed in said aperture and extending laterally from the opposite sides of the block, an adjusting screw having threaded engagement in the block and connected at its lower end to the center of said bar, said screw being adapted to move the bar vertically in said aperture, a spring blade spaced from the lower edge of the bar having its extremities engaged with the ends thereof, said blade extending through the aperture, the vertical adjustment of said bar being adapted to bow the spring longitudinally in substantially the same arc as the saw teeth, and a file secured to the central portion of said spring blade and disposed through said aperture adapted to engage with the saw teeth as the block and blade are moved longitudinally over the same.

3. In a device of the character described, a head block having a central longitudinal aperture therethrough, a kerf in the lower portion of said block communicating at its upper end with said aperture and adapted to receive a saw blade, the block having longitudinal movement thereon, an arcuate bar vertically movable in said aperture and extending laterally from the opposite sides of the block, an adjusting screw disposed through the block, the lower end of said screw being engaged with the bar and adapted to move the same, a spring blade disposed in spaced relation to the lower edge of the bar and extending through said aperture, the extremities of said blade being engaged with the ends of the bar, the central portion of the blade being raised, a file secured to said raised portion and spaced therefrom, said file being adapted to engage with the saw teeth as the head block is moved upon the blade.

4. In a device of the character described, a head block having a central rectangular aperture therethrough and a saw receiving kerf communicating in its upper end with said aperture, an adjusting rod in the block engaging with the bar and adapted to move the same vertically in the aperture, a spring blade having its extremities engaged with the ends of the bar and formed with a central raised portion disposed through the aperture in spaced relation to the bar, a file carried by the raised portion of said blade and spaced from the under side thereof, the adjustment of said bar being adapted to bow the spring blade into substantially the same arc as the saw teeth, the file being disposed above the plane of the end portions of the spring blade and adapted to engage with the longer teeth of the saw to reduce them to a uniform length as the block is moved longitudinally on the saw blade.

5. In a device of the character described, a head block having a central opening therethrough, a bar movably disposed in said opening and extending laterally from the opposite sides of the block, a spring blade spaced from the lower edge of said bar, the ends of the bar bearing upon the extremities of said blade, said blade gradually increasing in thickness toward its longitudinal center, an adjusting screw disposed through said block and engaged with the bar, and a file carried by said spring and disposed in longitudinal alinement therewith, substantially as and for the purpose set forth.

6. In a device of the character described, a head block having a central rectangular opening therethrough, a bar disposed in said opening extending laterally beyond the opposite sides of the block, said bar being longitudinally curved throughout its length, a spring blade extending through the opening in said block and disposed in spaced relation to the under side of the bar, the extremities of said blade being upwardly turned and engaged over the ends of the bar, said blade gradually increasing in thickness toward its center and normally curved oppositely to said bar, a file centrally arranged on said blade and in longitudinal alinement therewith, and an adjusting screw having threaded engagement in said head block adapted to move the bar vertically in the opening therein to depress the opposite ends of the spring blade and alter its direction of curvature, substantially as and for the purpose set forth.

7. In a device of the character described a block adapted for movable engagement with a saw blade, a bar carried thereby and extending laterally from the block above the teeth of the saw, a spring blade having its extremities engaged with the opposite ends of the bar, a file carried by the spring blade adapted to engage with the saw teeth when the block is moved upon the saw blade, and means for vertically adjusting the bar to bow said spring blade.

8. In a device of the character described, a head block adapted for movable engagement with a saw blade, a bar carried by said block, a spring blade extending through said block having its extremities engaged upon the opposite ends of said bar, means for moving said bar vertically in the block to bow said spring blade and dispose the same in contact with the saw teeth, the intermediate portion of said blade being spaced from the bar, and a file carried by said spring blade for movable contact with the teeth of the saw.

In testimony whereof I hereunto affix my signature in the presence of two witnesses.

AUGUST STECKER.

Witnesses:
P. A. WILLIAMS,
DAN WHITE.